United States Patent
Roh

(10) Patent No.: US 9,519,992 B2
(45) Date of Patent: Dec. 13, 2016

(54) APPARATUS AND METHOD FOR PROCESSING IMAGE

(71) Applicant: SAMSUNG ELECTRONICS CO., LTD., Suwon-si (KR)

(72) Inventor: Won-jun Roh, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 123 days.

(21) Appl. No.: 14/457,513

(22) Filed: Aug. 12, 2014

(65) Prior Publication Data

US 2015/0042656 A1 Feb. 12, 2015

Related U.S. Application Data

(60) Provisional application No. 61/864,877, filed on Aug. 12, 2013.

(30) Foreign Application Priority Data

Feb. 26, 2014 (KR) .................... 10-2014-0022489

(51) Int. Cl.
*G06T 15/06* (2011.01)
*G06T 17/00* (2006.01)
*G06T 15/00* (2011.01)
*G06T 15/80* (2011.01)

(52) U.S. Cl.
CPC ............ *G06T 15/06* (2013.01); *G06T 17/005* (2013.01); *G06T 15/005* (2013.01); *G06T 15/80* (2013.01)

(58) Field of Classification Search
None
See application file for complete search history.

(56) References Cited

U.S. PATENT DOCUMENTS

| 9,092,901 | B2* | 7/2015 | Wald | G06T 15/06 |
| 2009/0153556 | A1* | 6/2009 | Nam | G06T 15/06 345/421 |
| 2009/0213118 | A1* | 8/2009 | Ha | G06T 15/06 345/421 |
| 2009/0295805 | A1* | 12/2009 | Ha | G06T 15/06 345/426 |

(Continued)

FOREIGN PATENT DOCUMENTS

EP 2051533 A2 4/2009

OTHER PUBLICATIONS

Christensen et al., "Ray Differentials and Multiresolution Geometry Caching for Distribution Ray Tracing in Complex Scenes", 2003, 10 pages total, vol. 22, No. 3, The Eurographics Association and Blackwell Publishers.

(Continued)

*Primary Examiner* — Ryan M Gray
(74) *Attorney, Agent, or Firm* — Sughrue Mion, PLLC

(57) ABSTRACT

An image processing apparatus includes a ray generator configured to generate at least one ray, a plurality of tree searchers configured to perform a tree search of the generated at least one ray, an area divider configured to divide the generated at least one ray into a plurality of subareas based on information regarding a number of tree searches of a previous image frame, and a ray allocator configured to allocate the plurality of subareas divided by the area divider to the plurality of tree searchers respectively.

18 Claims, 7 Drawing Sheets

(56) References Cited

U.S. PATENT DOCUMENTS

| | | | |
|---|---|---|---|
| 2010/0188396 A1* | 7/2010 | Mejdrich | G06T 17/005 345/419 |
| 2011/0234583 A1* | 9/2011 | Bakalash | G06T 15/06 345/419 |
| 2012/0050289 A1 | 3/2012 | Park et al. | |
| 2012/0075287 A1 | 3/2012 | Park et al. | |
| 2012/0169728 A1* | 7/2012 | Mora | G06T 15/06 345/419 |
| 2013/0187947 A1* | 7/2013 | Barringer | G06T 11/40 345/629 |
| 2014/0176574 A1* | 6/2014 | Bakalash | G06F 12/0875 345/505 |
| 2014/0362074 A1* | 12/2014 | Karras | G06T 15/06 345/419 |

OTHER PUBLICATIONS

Written Opinion dated Nov. 11, 2014 issued by International Searching Authority in counterpart International Patent Application No. PCT/KR2014/007484.

International Search Report dated Nov. 11, 2014 issued by International Searching Authority in counterpart International Patent Application No. PCT/KR2014/007484.

* cited by examiner

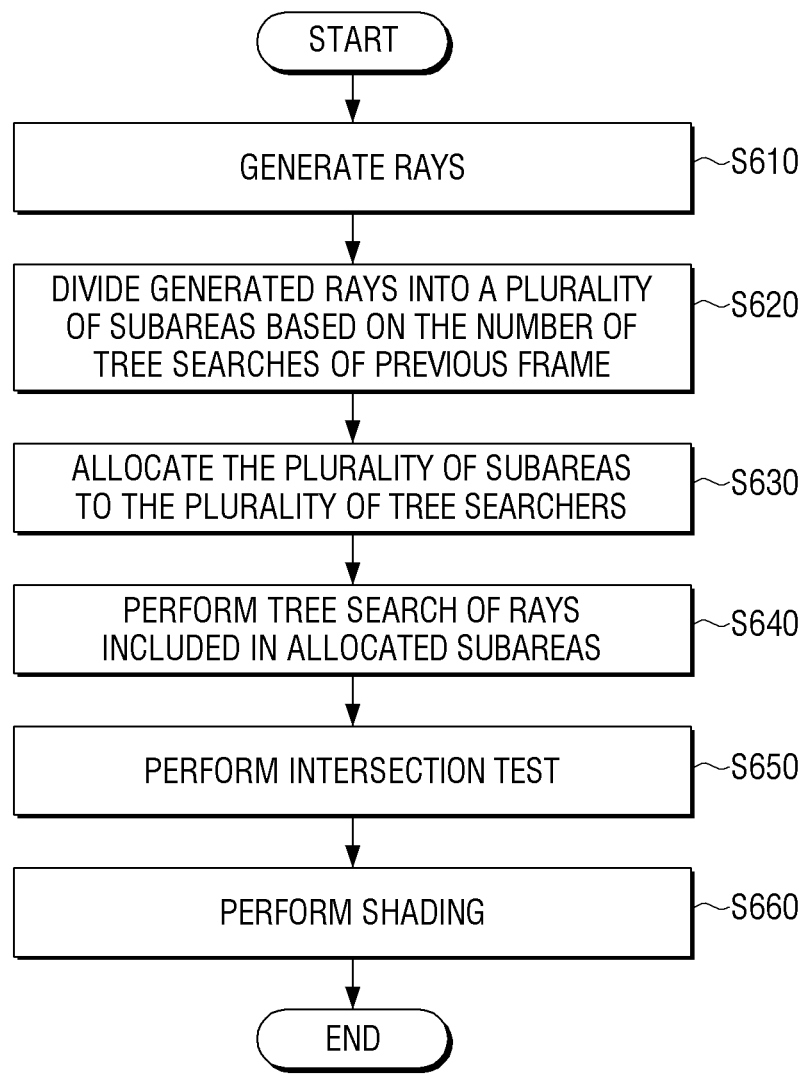

APPARATUS AND METHOD FOR PROCESSING IMAGE

CROSS-REFERENCE TO RELATED APPLICATIONS

This application claims priority from Korean Patent Application No. 10-2014-0022489, filed on Feb. 26, 2014, in the Korean Intellectual Property Office, and U.S. Provisional Application No. 61/864,877, filed on Aug. 12, 2013, in the USPTO, the disclosures of which is incorporated herein by reference in their entirety.

BACKGROUND

1. Field

Apparatuses and methods consistent with the exemplary embodiments relate to an image processing apparatus and an image processing method thereof, and more particularly, to an image processing apparatus capable of rendering an image ray tracing method.

2. Description of the Related Art

In a related art, graphic rendering is processed by a graphics processing unit (GPU), but realistic and 3-dimensional rendering is not possible. Recently, realistic rendering methods such as ray casting, ray tracing, and global illumination have been developed as more realistic and 3-dimensional rendering algorithms.

An image processing apparatus 100 in the related art includes a ray generator 110, a tree searcher 120, an intersection tester 130, and a shader 140 as shown in FIG. 1. An operating load of the tree searcher 120 is the largest operating load on the image processing apparatus 100, and the performance of the tree searcher 120 has the greatest effect on the entire performance of the image processing apparatus 100. Accordingly, in order to enhance the performance, the image processing apparatus 100 includes a plurality of tree searchers 120-1, 120-2, 120-3 . . . as shown in FIG. 1.

Each ray generated by the ray generator 110 is allocated to one of the plurality of tree searchers 120-1, 120-2, 120-3 . . . . The tree searcher to which a ray is allocated affects a cache memory hit ratio of the tree searcher 120. Since the cache memory hit ratio greatly affects the performance of the tree searcher 120, a method for efficiently allocating the ray to the tree searcher 120 is critical.

Related-art methods for allocating rays to the plurality of tree searchers 120-1, 120-2, 120-3 . . . are shown in FIGS. 2A and 2B. More specifically, a plurality of rays generated by the ray generator 110 are allocated to the plurality of tree searchers 120-1, 120-2, 120-3 . . . in the first-in first-out (FIFO) method as shown in FIG. 2A. That is, an empty tree searcher is searched by identifying an input FIFO state of the plurality of tree searchers 120-1, 120-2, 120-3 . . . so that the rays are sequentially allocated to empty tree searchers.

Alternatively, a plurality of rays generated by the ray generator 110 are divided into groups corresponding to the number of the plurality of tree searchers 120-1, 120-2, 120-3 . . . , and each group of rays are allocated to a corresponding tree searcher as shown in FIG. 2B.

However, these methods have the following problems. For example, in the method for allocating the rays in the FIFO method as shown in FIG. 2A, the correlation between rays processed by the tree searcher is low. Accordingly, a cache memory does not have a temporal locality effect, and thus a cache memory hit ratio becomes low. Therefore, the performance of the image processing apparatus may deteriorate.

In addition, the method for allocating rays into groups, as shown in FIG. 2B, yields a higher cache memory hit ratio by temporal locality effect. However, when rays requiring a large amount of tree searches are allocated to a certain group, a load balancing problem may occur. Thus, the tree searcher 120 may not operate efficiently.

SUMMARY

Exemplary embodiments may overcome the above disadvantages and other disadvantages not described above. Also, the exemplary embodiments are not required to overcome the disadvantages described above, and an exemplary embodiment may not overcome any of the problems described above.

The exemplary embodiments provide an image processing apparatus capable of enhancing the performance of tree searchers by allocating generated rays to the plurality of tree searchers in light of cache memory efficiency and load balancing, and an image processing method thereof.

According to an exemplary embodiment, an image processing apparatus includes a ray generator configured to generate at least one ray, a plurality of tree searchers configured to perform a tree search of the generated at least one ray, an area divider configured to divide the generated at least one ray into a plurality of subareas based on information regarding a number of tree searches of a previous image frame, and a ray allocator configured to allocate the plurality of subareas divided by the area divider to the plurality of tree searchers respectively.

The area divider may be configured to store a plurality of division categories where the subareas are divided by at least one method, determine a division category having a shortest tree search time for the previous image frame among the plurality of division categories, and divide the generated at least one ray into the plurality of subareas corresponding to the determined division category.

The area divider may be configured to divide the previous image frame into the plurality of subareas according to the division category, calculate a tree search value by adding up values obtained by multiplying the number of tree searches corresponding to pixels included in each subarea by a weighting corresponding to a size of each subarea, and determine a tree search time of the division category using the calculated tree search value.

The area divider may be configured to calculate tree search values of the plurality of division categories, and determine that a division category having a lowest tree search value among the calculated tree search values is the division category having the shortest tree search time.

The area divider may be configured to store information regarding the determined division category in a memory, and provide the ray allocator with the stored information regarding the determined division category when dividing a subsequent image frame into subareas.

The ray allocator may additionally allocate the at least one ray included in a subarea where the tree search has not been finished to a tree searcher that has finished the tree search of the at least one ray included in a corresponding subarea among the plurality of tree searchers.

The image processing apparatus may further include an intersection searcher configured to perform an intersection test of the tree-searched rays, and a shader configured to perform a shading of the intersection-tested rays.

According to another exemplary embodiment, an image processing method of an image processing apparatus includes generating at least one ray, dividing the generated at least one ray into a plurality of subareas based on information regarding a number of tree searches of a previous image frame, allocating the plurality of divided subareas to a plurality of tree searchers, respectively, and, by the plurality of tree searchers, performing a tree search of the generated at least one ray.

In the dividing operation, a plurality of division categories where the subareas are divided using at least one method may be stored, a division category having a shortest tree search time for the previous image frame among the plurality of division categories may be determined, and the generated at least one ray may be divided into the plurality of subareas corresponding to the determined division category.

In the dividing operation, the previous image frame may be divided into the plurality of subareas according to the division category, a tree search value may be calculated by adding values obtained by multiplying the number of tree searches corresponding to pixels included in each subarea by a weighting corresponding to a size of each subarea, and a tree search time of the division category may be determined using the calculated tree search value.

In the dividing operation, tree search values of the plurality of division categories may be calculated, and a division category having a lowest tree search value among the calculated tree search values may be determined to be the division category having the shortest tree search time.

The dividing operation may include storing information regarding the determined division category in a memory, and providing the ray allocator with the stored information regarding the determined division category when dividing a subsequent image frame into subareas.

In the allocating operation, the at least one ray included in a subarea where the tree search has not been finished may be additionally allocated to a tree searcher that has finished the tree search of the at least one ray included in a corresponding subarea among the plurality of tree searchers.

The method may further include performing an intersection test of the tree-searched rays, and performing a shading of the intersection-tested rays.

According to another exemplary embodiment, a method of processing an image includes generating at least one ray, dividing the generated at least one ray into at least one subarea, allocating the generated at least one ray to at least one tree searcher according to subarea division information, and performing a tree search of the at least one ray by the at least one tree searcher, where the at least one ray is allocated according to a tree search time of a previous image frame.

The method may further include performing an intersection test of the at least one ray which was tree searched, and performing a shading of the at least one ray which was tree searched.

The at least one ray may be divided into at least one subarea corresponding to the subarea division information.

Accordingly to another exemplary embodiment, an image processing apparatus includes a ray generator configured to generate at least one ray, an area divider configured to divide an image frame into at least one subarea, a ray allocator configured to allocate the generated at least one ray to at least one subarea, and at least one tree searcher configured to perform a tree search on the allocated at least one ray, where the at least one ray is allocated according to subarea division information.

The image processing apparatus may further include an intersection tester configured to perform an intersection test of the at least one ray having undergone tree searching.

The shader may be configured to shade the at least one ray having undergone the intersection test.

Additional and/or other aspects and advantages of the exemplary embodiments will be set forth in part in the description which follows and, in part, will be obvious from the description, or may be learned by practice of the exemplary embodiments.

BRIEF DESCRIPTION OF THE DRAWINGS

The above and/or other aspects of the exemplary embodiments will be more apparent with reference to the accompanying drawings, in which:

FIG. 6 is a flow chart of an image processing method according to an exemplary embodiment.

DETAILED DESCRIPTION

Figure 1:
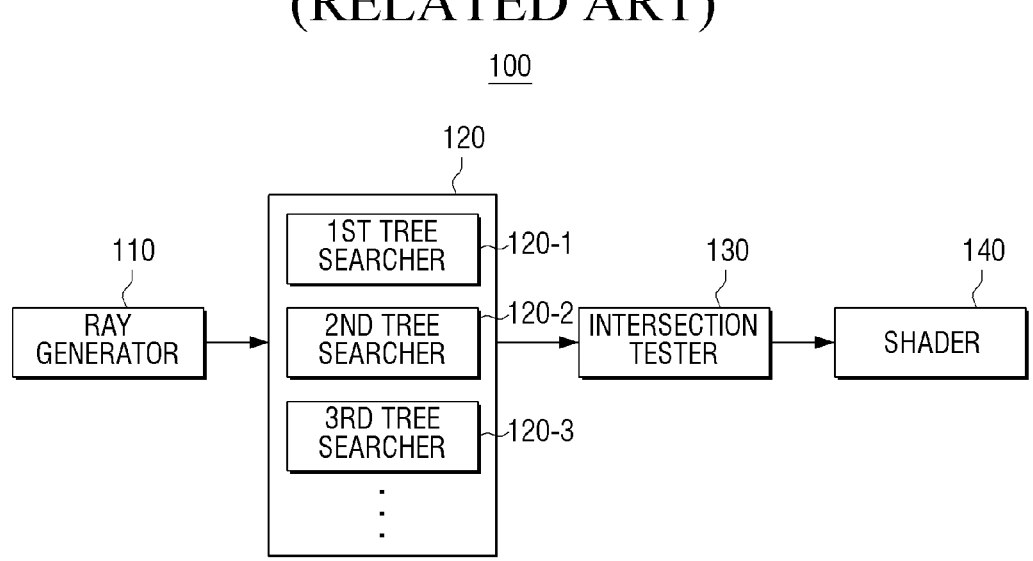
FIG. 1 is a block diagram of a configuration of an image processing apparatus in the related art.
Figure 2A:
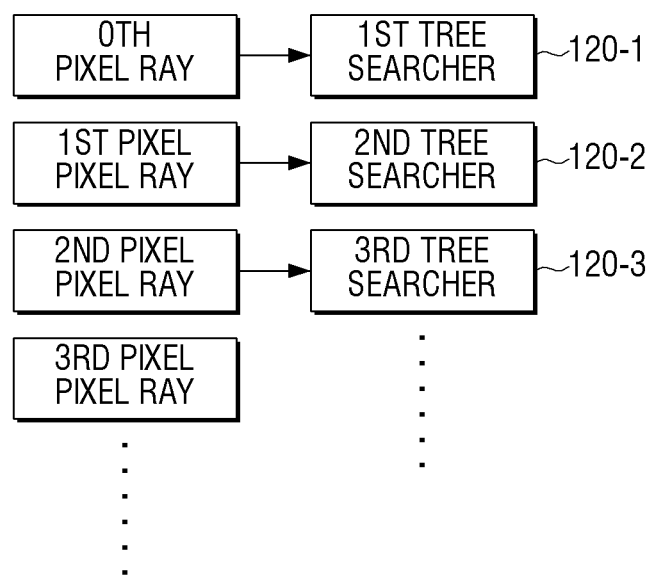
FIGS. 2A and 2B illustrate methods for allocating rays in the related art.
Figure 2B:
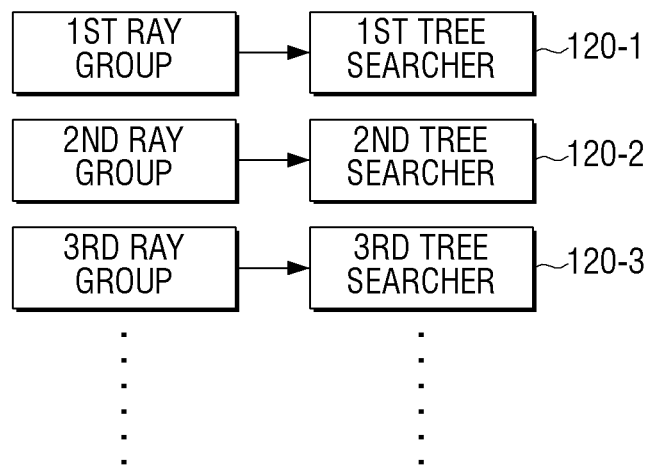

The exemplary embodiments may be diversely modified. Accordingly, exemplary embodiments are illustrated in the drawings and are described in detail in the detailed description. The matters defined in the description, such as detailed construction and elements, are provided to assist in a comprehensive understanding of the invention. Thus, it is apparent that the exemplary embodiments can be carried out without those specifically defined matters. Also, well-known functions or constructions are not described in detail since they would obscure the invention with unnecessary detail.

The terms "first", "second", . . . may be used to describe diverse components, but the components are not limited by the terms. The terms are only used to distinguish one component from the others.

The terms are only used to describe the exemplary embodiments, but are not intended to limit the scope of the exemplary embodiments. The singular expression also includes the plural meaning as long as it does not state differently. The terms "include" and "consist of" designates the presence of features, numbers, steps, operations, components, elements, or a combination thereof that are written in the specification, but does not exclude the presence or possibility of an addition of one or more other features, numbers, steps, operations, components, elements, or a combination thereof.

According to an exemplary embodiment, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

The exemplary embodiments will now be described in greater detail with reference to the accompanying drawings. In the following description, same drawing reference numerals are used for the same elements even in different drawings. Thus, description of the same elements is not repeated.

Figure 3:
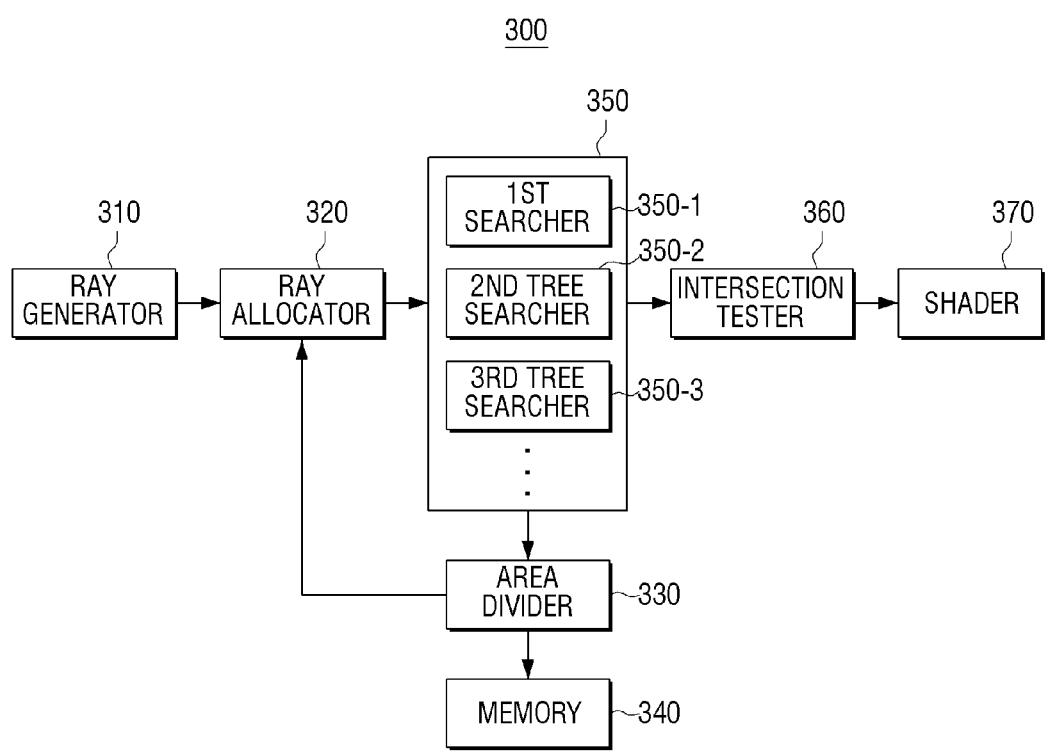
FIG. 3 is a block diagram of a configuration of an image processing apparatus according to an exemplary embodiment.

FIG. 3 is a block diagram of a configuration of an image processing apparatus 300 according to an exemplary embodiment. With reference to FIG. 3, the image processing apparatus 300 may include a ray generator 310, a ray allocator 320, an area divider 330, a memory 340, a plurality of tree searchers 350-1, 350-2, 350-3, . . . , an intersection tester 360, and a shader 370. The image processing apparatus 300 may be implemented with diverse image processing apparatuses such as a smart phone, a smart TV, a tablet personal computer (PC), a notebook PC, and the like.

The ray generator 310 generates a ray to output image data in accordance with the ray tracing method. The ray generator 310 may generate a ray for each of the plurality of pixels that compose the image data.

More specifically, the ray generator 310 may generate at least one ray based on ray generation information. In particular, the ray generator 310 may acquire a screen coordinate value of the ray based on the ray generation information. In addition, the ray generator 310 may generate the ray based on the acquired screen coordinate value and a location of a camera (that is, a location of a user's eyes in connection with the screen).

The ray allocator 320 may allocate rays generated by the ray generator 310 to the plurality of tree searchers 350-1, 350-2, 350-3, . . . based on subarea division information provided from the area divider 330. The subarea division information may include information regarding a plurality of subareas that divide the image frame. In other words, the ray allocator 320 may allocate rays included in subareas, which are adaptively divided from each frame by the area divider 330, to the plurality of tree searchers 350-1, 350-2, 350-3, . . . , respectively.

The ray allocator 320 may additionally allocate rays included in a subarea where a tree search has not been finished to a tree searcher that has finished a tree search of rays included in a corresponding subarea among the plurality of tree searchers 350-1, 350-2, 350-3, . . . . For example, when a tree search has been finished for rays included in a subarea allocated to the first tree searcher 350-1, and when a tree search has not been finished for rays included in a subarea allocated to the second tree searcher 350-2, the ray allocator 320 may reallocate a portion of the rays included in the subarea allocated to the second tree searcher 350-2 to the first tree searcher 350-1. Since the ray allocator 320 may adaptively allocate rays from a tree searcher where a tree search has not been finished to a tree searcher that has finished tree search as described above, a faster tree search may be possible.

Since the area divider 330 divides the subareas based on information regarding the number of tree searches of a previous frame, the ray allocator 320 may allocate rays included in the initial frame to the plurality of tree searchers 350-1, 350-2, 350-3, . . . in a predetermined method.

The area divider 330 divides a subsequent frame into a plurality of subareas based on information regarding the number of tree searches of the previous image frame.

Figure 4:
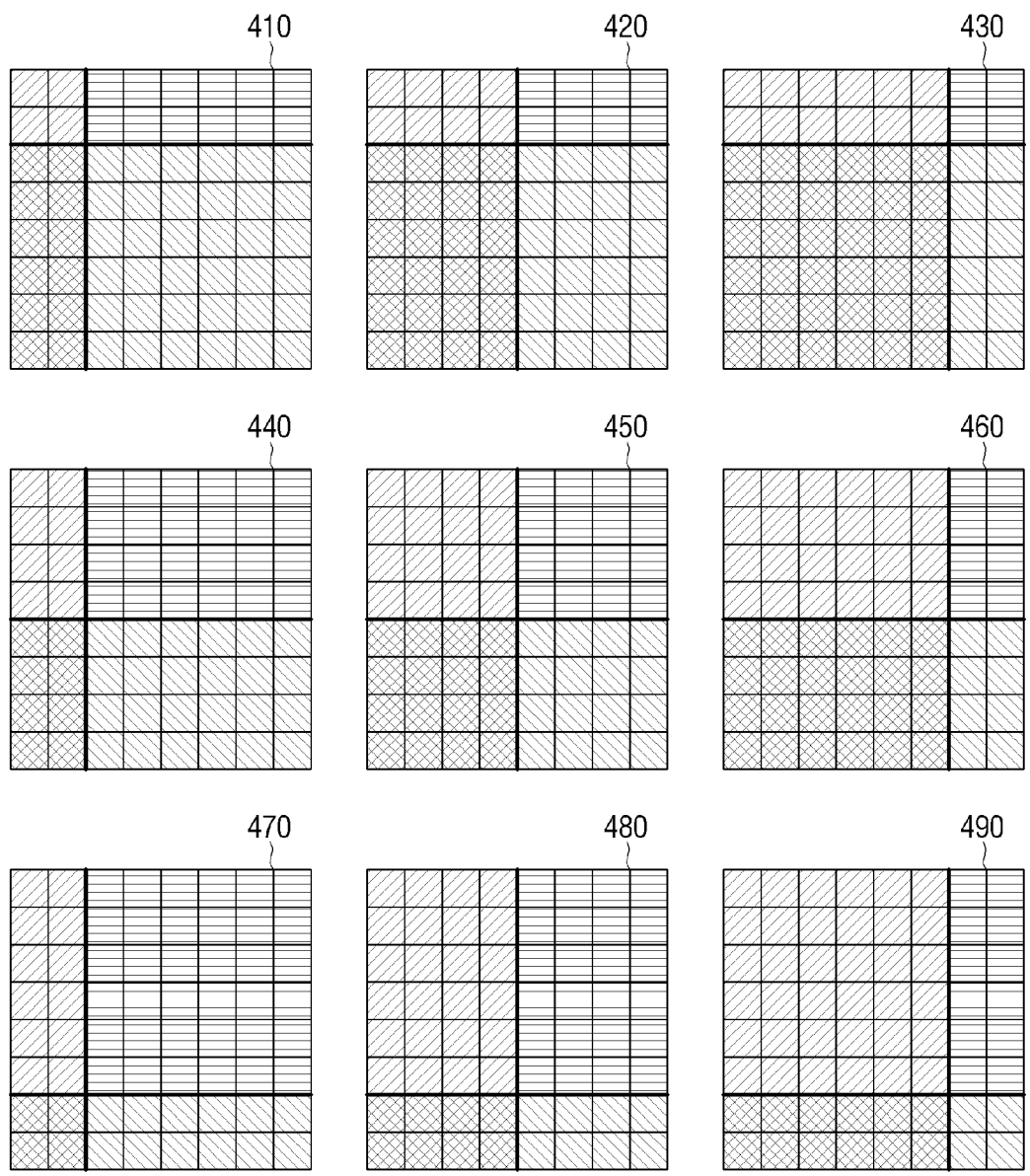
FIG. 4 illustrates a plurality of division categories according to an exemplary embodiment.

More specifically, the area divider 330 may store a plurality of division categories where the subareas are divided in a plurality of methods. For example, when an image frame consists of an 8×8 area and is divided into 4 subareas, the area divider 330 may store a first division category 410 to a ninth division category 490 as shown in FIG. 4. In greater detail, the first division category 410 has a first subarea of 2×2 at an upper left portion, a second subarea of 2×6 at an upper right portion, a third subarea of 6×2 at a lower left portion, and a fourth subarea of 6×6 at a lower right portion. The second division category 420 has a first subarea of 2×4 at an upper left portion, a second subarea of 2×4 at an upper right portion, a third subarea of 6×4 at a lower left portion, and a fourth subarea of 6×4 at a lower right portion. The third division category 430 has a first subarea of 2×6 at an upper left portion, a second subarea of 2×2 at an upper right portion, a third subarea of 6×6 at a lower left portion, and a fourth subarea of 6×2 at a lower right portion. The fourth division category 440 has a first subarea of 4×2 at an upper left portion, a second subarea of 4×6 at an upper right portion, a third subarea of 4×2 at a lower left portion, and a fourth subarea of 4×6 at a lower right portion. The fifth division category 450 has first to fourth subareas of 4×4. The sixth division category 460 has a first subarea of 4×6 at an upper left portion, a second subarea of 4×2 at an upper right portion, a third subarea of 4×6 at a lower left portion, and a fourth subarea of 4×2 at a lower right portion. The seventh division category 470 has a first subarea of 6×2 at an upper left portion, a second subarea of 6×6 at an upper right portion, a third subarea of 2×2 at a lower left portion, and a fourth subarea of 2×6 at a lower right portion. The eighth division category 480 has a first subarea of 6×4 at an upper left portion, a second subarea of 6×4 at an upper right portion, a third subarea of 2×4 at a lower left portion, and a fourth subarea of 2×4 at a lower right portion. The ninth division category 490 has a first subarea of 6×6 at an upper left portion, a second subarea of 6×2 at an upper right portion, a third subarea of 2×6 at a lower left portion, and a fourth subarea of 2×2 at a lower right portion.

Dividing each division category into four subareas as described above is merely an exemplary embodiment. It is also possible to divide each division category into a plurality of subareas other than four subareas. The number of the subareas in each division category may correspond to the number of the tree searchers 350. For example, when the number of the tree searchers 350 is eight, the number of the subareas in each division category may be eight.

In addition, the area divider 330 may determine a division category having a shortest tree search time for the previous image frame among the plurality of stored division categories 410 to 490, and divide a previous image frame into a plurality of subareas corresponding to the determined division category. More specifically, the area divider 330 may calculate a tree search value which is in proportion to a tree search time, and determine a tree search time of each division category using the calculated tree search value.

At this time, the area divider 330 may calculate the tree search value by dividing the previous image frame into a plurality of subareas in accordance with a specific division category, and adding up values obtained by multiplying the number of tree searches corresponding to pixels included in each subarea by a weighting corresponding to the size of each subarea. The tree search value may be calculated using Mathematical expression 1 below.

$$P_{cat} = (\Sigma TRV_{CNT}(i1) * w1) + (\Sigma TRV_{CNT}(i2) * w2) + (\Sigma TRV_{CNT}(i3) * w3) + (\Sigma TRV_{CNT}(i4) * w4)$$ [Mathematical expression 1]

In Mathematical expression 1, TRV_CRT(i) indicates the number of tree searches of the $i^{th}$ pixel, w1 indicates a weighting of the first subarea, w2 indicates a weighting of the second subarea, w3 indicates a weighting of the third subarea, and w4 indicates a weighting of the fourth subarea. The weightings w1, w2, w3, and w4 correspond to the size of the corresponding subareas respectively.

Figure 5:
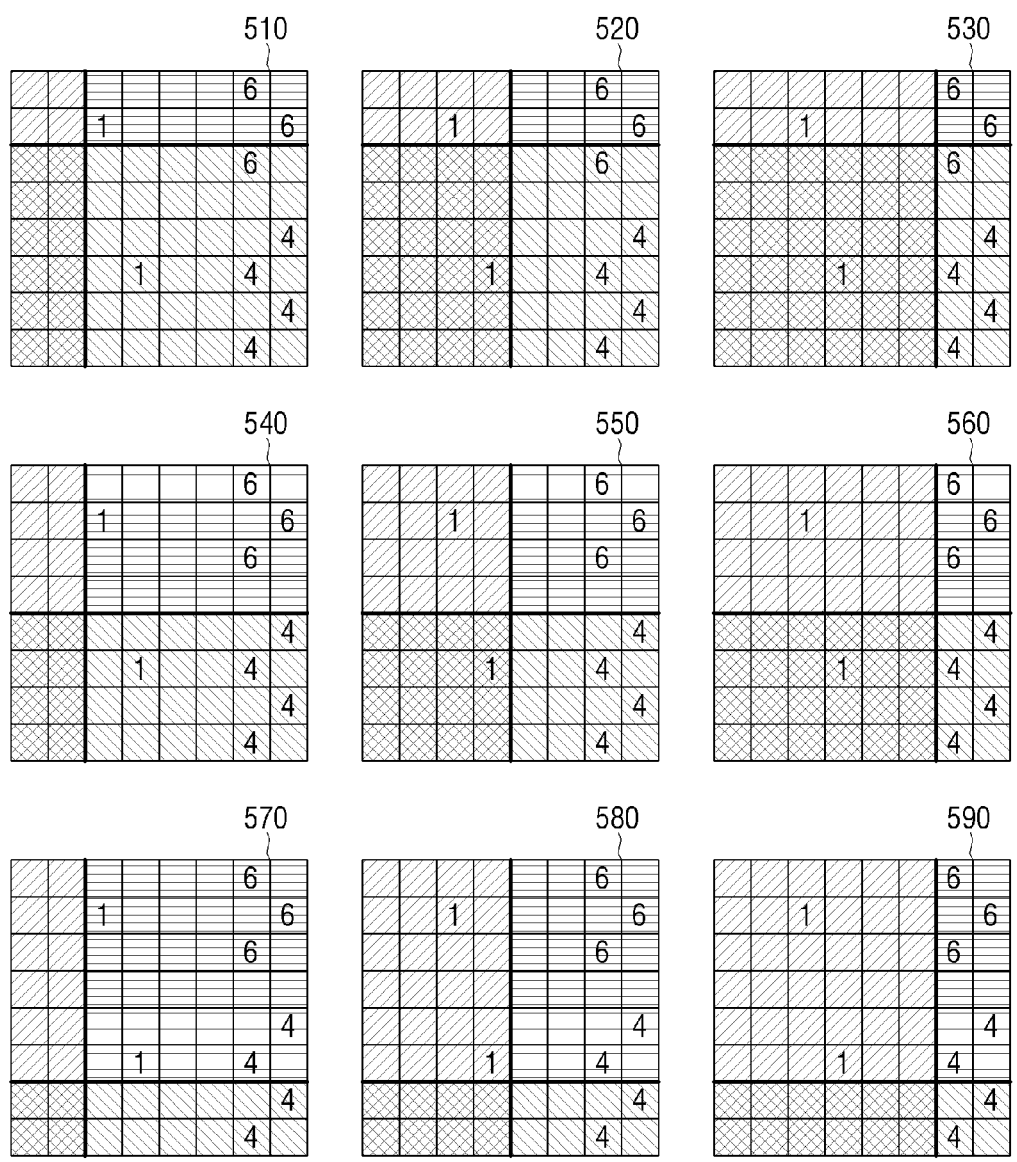
FIG. 5 illustrates a method for calculating a tree search value of each of the plurality of division categories for an image frame according to an exemplary embodiment.

For example, when the number of tree searches of each pixel included in the previous image frame is shown in FIG. 5, the area divider 330 may calculate a tree search value of each division category 410 to 490 as shown in Mathematical expression 2 below.

$$P_{cat1}=(0*4)+(13*12)+(0*12)+(23*36)=984$$

$$P_{cat2}=(1*8)+(12*8)+(1*24)+(22*24)=656$$

$$P_{cat3}=(1*12)+(12*4)+(1*36)+(22*12)=360$$

$$P_{cat4}=(0*8)+(19*24)+(0*8)+(17*24)=864$$

$$P_{cat5}=(1*16)+(18*16)+(1*16)+(16*16)=576$$

$$P_{cat6}=(1*24)+(18*8)+(1*24)+(16*8)=320$$

$$P_{cat7}=(0*12)+(28*36)+(0*4)+(8*12)=1114$$

$$P_{cat8}=(2*24)+(26*24)+(0*8)+(8*8)=736$$

$$P_{cat9}=(2*36)+(26*12)+(0*12)+(8*4)=416 \quad \text{[Mathematical expression 2]}$$

In addition, the area divider 330 may determine that a division category having a lowest tree search value among the tree search values calculated for the plurality of division categories 410 to 490 is a division category having the shortest tree search time. For example, when tree search values of the first to the ninth division categories 410 to 490 are calculated as described above, the area divider 330 may determine that the sixth division category 460 having the lowest tree search value is a division category having the shortest tree search time.

In addition, the area divider 330 may provide the ray allocator 320 with information regarding the division category having the shortest tree search time for the previous frame image as subarea division information for a subsequent image frame. For example, when it is determined that a division category having the shortest tree search time is the sixth division category 460 as calculated in Mathematical expression 2, the area divider 330 may provide the ray allocator 320 with information regarding the sixth division category 460.

The ray allocator 320 may allocate rays to the plurality of tree searchers 350-1, 350-2, 350-3, . . . based on the received subarea division information. For example, when the ray allocator 320 receives information regarding the sixth division category 460 as subarea division information, the ray allocator 320 may allocate generated rays to the plurality of tree searchers 350-1, 350-2, 350-3, . . . based on the sixth division category 460. More specifically, the ray allocator 320 may allocate rays included in the first subarea of the sixth division category 460 to the first tree searcher 350-1, allocate rays included in the second subarea of the sixth division category 460 to the second tree searcher 350-2, allocate rays included in the third subarea of the sixth division category 460 to the third tree searcher 350-3, and allocate rays included in the fourth subarea of the sixth division category 460 to the fourth tree searcher 350-4.

In addition, the area divider 330 may store the information regarding the division category determined for the previous frame in the memory 340, and provide the ray allocator 320 with the information regarding the division category stored in the memory 240 when dividing a subsequent image frame into subareas.

Each tree searcher 350 performs a tree search of received rays. Each tree searcher 350 may use a kd-tree that is a kind of spatial partitioning tree method. The kd-tree may include a box node, an inner node, and a leaf node. The leaf node may include a triangle list to point to at least one piece of triangle information included in geometry data. In an exemplary embodiment of the present invention, when the triangle information included in the geometry data is implemented with an array, the triangle list included in the leaf node corresponds to an array index.

However, using the kd-tree as described above is merely an exemplary embodiment. Diverse tree search methods such as bounding volume hierarchy and/or other tree search methods may be used.

In particular, since heavy loads may be generated for a tree search, the image processing apparatus 300 may include the plurality of tree searchers 350-1, 350-2, 350-3, . . . as shown in FIG. 3 so that each of the tree searchers 350-1, 350-2, 350-3, . . . may perform a tree search of the rays independently.

The intersection tester 360 performs an intersection test of a ray where a tree search is performed. More specifically, the intersection tester 360 searches for a leaf node which intersects a ray, and reads a triangle list included in the leaf node. In addition, the intersection tester 360 reads coordinate information of the triangle list and performs an intersection test of the given ray. In addition, the intersection tester 360 calculates a coordinate value of a ray-triangle hit point using a distance from a triangle hit by the ray and a vector value of the given ray.

The shader 370 performs shading of the ray where the intersection test is performed. More specifically, the shader 370 may calculate a color value of the ray-triangle hit point using information stored in a material memory and a triangle information cache, and perform shading based on the calculated color value.

Hereinafter, an image processing method of the image processing apparatus 300 is described with reference to FIG. 6.

Firstly, the image processing apparatus 300 generates a ray (S610). The image processing apparatus 300 may generate a ray for each pixel of an image frame.

Subsequently, the image processing apparatus 300 divides the generated rays into a plurality of subareas based on the number of tree searches of a previous frame (S620). More specifically, the image processing apparatus 300 may store a plurality of division categories where the subareas are divided using one from among a plurality of methods, determine a division category having a shortest tree search time for a previous image frame among the plurality of stored division categories, and divide the generated rays into a plurality of subareas corresponding to the determined division category. In greater detail, the image processing apparatus 300 may calculate the tree search value by dividing the previous image frame into a plurality of subareas in accordance with a specific division category, and adding up values obtained by multiplying the number of tree searches corresponding to pixels included in each subarea by a weighting corresponding to the size of each subarea. In addition, the image processing apparatus 300 may calculate the tree search values of the plurality of division categories, and determine that a division category having a lowest tree search value among the calculated tree search values is a division category having a shortest tree search time.

Subsequently, the image processing apparatus 300 allocates the plurality of subareas to the plurality of tree searchers 350-1, 350-2, 350-3, . . . (S630). More specifically, the image processing apparatus 300 may divide the plurality of subareas based on information according to the division category having the shortest tree search time, and allocate rays included in each subarea to each corresponding tree searcher.

Subsequently, the image processing apparatus 300 performs a tree search of the rays included in the allocated subareas (S640). The image processing apparatus 300 may independently perform a tree search of the rays using the plurality of tree searchers 350-1, 350-2, 350-3, . . . .

Subsequently, the image processing apparatus 300 performs an intersection test and a shading of the tree-searched rays (S650 and S660).

Since a group of rays having a high correlation are allocated to a single tree searcher according to a subarea as described above, a cache memory hit ratio of the tree searchers may be enhanced. Consequently, the performance of the tree searchers 350 and the entire performance of the image processing apparatus 300 may be enhanced, and an external memory bandwidth may be reduced. Furthermore, since a group of rays are adaptively divided into subgroups in light of a previous frame and are allocated to the tree searchers, good load balancing may be maintained.

The apparatus according to the exemplary embodiments may include a processor, a memory that stores and executes program data, a permanent storage such as a disk drive, a communication port that communicates with an external apparatus, and a user interface apparatus such as a touch panel, a key, and a button. The methods that are implemented with a software module or an algorithm are codes or program commands that are executable on the processor and readable by a computer, and may be stored in a recording medium readable by a computer. The recording medium readable by a computer may include a magnetic storage medium (for example, a read-only memory, a random-access memory, a floppy disk, a hard disk, etc.) and an optical readable medium (for example, a compact disk read-only memory (CD-ROM), a digital versatile disk (DVD), etc.) The recording medium readable by a computer may disperse in computer systems that are connected over a network so that a code readable by a computer may be stored and executed in a dispersion method. The medium may be readable by a computer, be stored in a memory, and be executed by a processor.

The exemplary embodiments may be represented by functional block components and diverse processing steps. The functional blocks may be implemented with diverse numbers of hardware and/or software components that execute specific functions. For example, an exemplary embodiment may employ direct circuit components, such as a memory, processing, logic, and a look-up table, that execute diverse functions by control of one or more microprocessors or other control apparatuses. As the components are executed as software programming or software elements, the exemplary embodiments of the present invention may be realized in a programming or scripting language such as C, C++, Java, and an assembler, including diverse algorithms that are implemented with data structure, processes, routines, or combination of other programming components. The functional factors may be implemented with an algorithm executed by one or more processors. In addition, the exemplary embodiments may employ the related art for electronic configuration, signal processing, and/or data processing. The terms "mechanism", "element", "means", and "component" may be used in a broad sense, and is not limited to mechanical or physical components. The terms may include a set of routines of software that are connected with a processor.

The foregoing exemplary embodiments and advantages are merely exemplary and are not to be construed as limiting. For simplicity, electronic components, control systems, software, and other functional factors in the related art may be omitted. In addition, connection of lines or connection members between the components in the drawings illustrate functional connection and/or physical or circuital connection as example, and thus in a real apparatus, replaceable or additional diverse functional connection, physical connection or circuital connection may be provided.

In this specification (especially in the claims), the use of the term "the" and similar referential terms may refer to both the singular and the plural. In addition, when a range is written, individual values within the range are included, unless there is no contrary mention. Accordingly, it is the same as the individual values that compose the range are written in the detailed description. Finally, the steps that compose the method may be performed in appropriate order if the order is not obviously written or if there is no contrary mention. The present exemplary embodiments are not always limited to the order in which the steps are written. The foregoing exemplary embodiments and advantages are merely exemplary and are not to be construed as limiting. Also, the description of the exemplary embodiments is intended to be illustrative, and not to limit the scope of the claims, and many alternatives, modifications, and variations will be apparent to those skilled in the art.

What is claimed is:

1. An image processing apparatus comprising:
   a processor configured to execute:
   a ray generator configured to generate at least one ray;
   a plurality of tree searchers configured to perform a tree search of the generated at least one ray;
   an area divider configured to divide the generated at least one ray into a plurality of subareas based on information regarding a number of tree searches of a previous image frame; and
   a ray allocator configured to allocate the plurality of subareas divided by the area divider to the plurality of tree searchers, respectively, wherein the area divider is configured to store a plurality of division categories wherein the subareas are divided by at least one method, determine a division category having a shortest tree search time for the previous image frame among the plurality of division categories, and divide the generated at least one ray into a plurality of subareas corresponding to the determined division category.

2. The image processing apparatus as claimed in claim 1, wherein the area divider is configured to divide the previous image frame into the plurality of subareas according to the division category, calculate a tree search value by adding values obtained by multiplying the number of tree searches corresponding to pixels included in each subarea by a weighting corresponding to a size of each subarea, and determine a tree search time of the division category using the calculated tree search value.

3. The image processing apparatus as claimed in claim 1, wherein the area divider is configured to calculate tree search values of the plurality of division categories, and determine that a division category having a lowest tree search value among the calculated tree search values is the division category having the shortest tree search time.

4. The image processing apparatus as claimed in claim 1, wherein the area divider is configured to store information regarding the determined division category in a memory, and provide the ray allocator with the stored information regarding the determined division category when dividing a subsequent image frame into subareas.

5. The image processing apparatus as claimed in claim 1, wherein the ray allocator additionally allocates the at least one ray included in a subarea where the tree search has not been finished to a tree searcher that has finished the tree search of the at least one ray included in a corresponding subarea among the plurality of tree searchers.

6. The image processing apparatus as claimed in claim 1, wherein the processor is further configured to execute:
   an intersection searcher configured to perform an intersection test of the tree-searched rays; and
   a shader configured to perform a shading of the intersection-tested rays.

7. An image processing method of an image processing apparatus, the method comprising:
   generating at least one ray;
   dividing the generated at least one ray into a plurality of subareas based on information regarding a number of tree searches of a previous image frame;
   allocating the plurality of divided subareas to a plurality of tree searchers, respectively; and
   by the plurality of tree searchers, performing a tree search of the generated at least one ray,
   wherein in the dividing operation, a plurality of division categories where the subareas are divided using at least one method are stored, a division category having a shortest tree search time for the previous image frame among the plurality of division categories is determined, and the generated at least one ray is divided into the plurality of subareas corresponding to the determined division category.

8. The method as claimed in claim 7, wherein, in the dividing operation, the previous image frame is divided into the plurality of subareas according to the division category, a tree search value is calculated by adding values obtained by multiplying the number of tree searches corresponding to pixels included in each subarea by a weighting corresponding to a size of each subarea, and a tree search time of the division category is determined using the calculated tree search value.

9. The method as claimed in claim 7, wherein, in the dividing operation, tree search values of the plurality of division categories are calculated, and a division category having a lowest tree search value among the calculated tree search values is determined to be the division category having the shortest tree search time.

10. The method as claimed in claim 7, wherein the dividing operation comprises:
    storing information regarding the determined division category in a memory; and
    providing the ray allocator with the stored information regarding the determined division category when dividing a subsequent image frame into subareas.

11. The method as claimed in claim 7, wherein, in the allocating operation, the at least one ray included in a subarea where the tree search has not been finished is additionally allocated to a tree searcher that has finished the tree search of the at least one ray included in a corresponding subarea among the plurality of tree searchers.

12. The method as claimed in claim 7, further comprising:
    performing an intersection test of the tree-searched rays; and
    performing a shading of the intersection-tested rays.

13. A method of processing an image, the method comprising:
    generating at least one ray;
    dividing the generated at least one ray into at least one subarea;
    allocating the generated at least one ray to at least one tree searcher according to subarea division information; and
    performing a tree search of the at least one ray by the at least one tree searcher,
    wherein the at least one ray is allocated according to a tree search time of a previous image frame,
    wherein, in the dividing operation, a plurality of division categories where the subareas are divided using at least one method are stored, a division categories having a shortest tree search time for the previous image frame among the plurality of division categories is determined, and the generated at least one ray is divided into the plurality of subareas corresponding to the determined division category.

14. The method of claim 13, further comprising:
    performing an intersection test of the at least one ray which was tree searched; and
    performing a shading of the at least one ray which was tree searched.

15. The method of claim 13, wherein the at least one ray is divided into at least one subarea corresponding to the subarea division information.

16. An image processing apparatus, comprising:
    a processor configured to execute:
    a ray generator configured to generate at least one ray;
    an area divider configured to divide an image frame into at least one subarea;
    a ray allocator configured to allocate the generated at least one ray to at least one subarea; and
    at least one tree searcher configured to perform a tree search on the allocated at least one ray, wherein the at least one ray is allocated according to subarea division information, wherein the area divider is configured to store a plurality of division categories where the subareas are divided by a least one method, determine a division category having a shortest tree search time for the previous image frame among the plurality of division categories, and divide the generated at least one ray into the plurality of subareas corresponding to the determined division category.

17. The image processing apparatus of claim 16, wherein the processor is further configured to execute:
    an intersection tester configured to perform an intersection test of the at least one ray having undergone tree searching.

18. The image processing apparatus of claim 17, wherein the processor is further configured to execute:
    a shader configured to shade the at least one ray having undergone the intersection test.

* * * * *